US007545473B2

(12) United States Patent
Ueda et al.

(10) Patent No.: US 7,545,473 B2
(45) Date of Patent: Jun. 9, 2009

(54) DISPLAY APPARATUS WITH INSPECTION AND METHOD OF MANUFACTURING THE SAME

(75) Inventors: Hiroshi Ueda, Kikuchi-gun (JP); Hitoshi Morishita, Kikuchi-gun (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/400,198

(22) Filed: Apr. 10, 2006

(65) Prior Publication Data

US 2006/0181657 A1    Aug. 17, 2006

Related U.S. Application Data

(63) Continuation of application No. 10/625,511, filed on Jul. 24, 2003, now abandoned.

(30) Foreign Application Priority Data

Aug. 8, 2002    (JP)    ............................. 2002-231360

(51) Int. Cl.
*G02F 1/1345* (2006.01)
*G02F 1/1333* (2006.01)

(52) U.S. Cl. ...................... 349/149; 349/150; 349/151; 349/152; 349/40

(58) Field of Classification Search .................. 349/54, 349/149–152, 40
See application file for complete search history.

(56) References Cited

U.S. PATENT DOCUMENTS

| 5,636,329 | A | | 6/1997 | Sukegawa et al. | |
|---|---|---|---|---|---|
| 5,668,700 | A | * | 9/1997 | Tagusa et al. | 361/779 |
| 5,712,493 | A | * | 1/1998 | Mori et al. | 257/59 |
| 5,748,179 | A | * | 5/1998 | Ito et al. | 349/152 |
| 5,945,984 | A | * | 8/1999 | Kuwashiro | 345/206 |
| 6,245,175 | B1 | * | 6/2001 | Hotta et al. | 156/172 |
| 6,750,926 | B2 | * | 6/2004 | Ohgiichi et al. | 349/40 |
| 2001/0015709 | A1 | * | 8/2001 | Imajo et al. | 345/87 |

FOREIGN PATENT DOCUMENTS

| JP | 3-29925 | 2/1991 |
|---|---|---|
| JP | 7-152045 | 6/1995 |
| JP | 9-80456 | 3/1997 |
| JP | 2000-081635 | 3/2000 |
| KR | 10-0262899 | 8/2000 |
| KR | 2001-0043384 | 5/2001 |

* cited by examiner

*Primary Examiner*—David Nelms
*Assistant Examiner*—Hoan C Nguyen
(74) *Attorney, Agent, or Firm*—Oblon, Spivak, McClelland, Maier & Neustadt, P.C.

(57) ABSTRACT

A display apparatus has an insulating substrate, a signal line for transmitting a signal to a pixel formed in a display area on the insulating substrate, a driver integrated circuit (IC) mounted outside of the display area of the insulating substrate and electrically connected to the signal line, and an inspection pad formed outside of the display area and electrically connected to the signal line. The inspection pad is covered with resin.

10 Claims, 4 Drawing Sheets

DISPLAY APPARATUS WITH INSPECTION AND METHOD OF MANUFACTURING THE SAME

BACKGROUND OF THE INVENTION

1. Field of the Invention

The present invention relates to a display apparatus, and more particularly, to a display apparatus with an inspection pad for inspecting a display panel and a method of manufacturing the same.

2. Description of the Related Art

Conventionally known as a technique for preventing static electricity from entering a display apparatus such as an active matrix liquid crystal display apparatus is one disclosed in Japanese Unexamined Patent Application Publication No. H03-29925. FIG. 4 is a plan view showing lines formed in the vicinity of a driver IC in the conventional liquid crystal display apparatus. The liquid crystal display apparatus has a TFT substrate 1, IC signal pads 4 on the TFT substrate, conductive lines 3 connecting a pixel and the IC signal pads 4, inspection pads 8, conductive extension lines 7, power source lines 9, and a shorting line 12. The reference symbol 15 designates a line for cutting and removing the shorting line 12.

Referring to FIG. 4, the shorting line 12 is formed to surround the TFT substrate 1, and all lines are connected to the shorting line 12. The conductive extension lines 7 are also connected to the shorting line 12, passing under a driver IC (not shown). In this configuration, all lines have the same electric potential, thereby preventing static electricity damaging the TFT and the driver IC in the manufacturing process. The configuration also allows easy inspection of IC defects and wire bonding immediately after IC bonding, thus facilitating parts replacement and repair as well as process control to improve process yield.

Since the inspection pads are exposed, however, the conventional technique has a problem that the inspection pads corrode due to contaminants and dew condensation. It also has a problem that static electricity entering the inspection pads damages a TFT and the driver IC.

SUMMARY OF THE INVENTION

Accordingly, an object of the present invention is to protect a TFT and driver IC from damage due to static electricity entering through inspection pads. Another object of the present invention is to prevent corrosion of inspection pads. Another object of the present invention is to improve yield and quality of a display apparatus.

A display apparatus according to the present invention has an insulating substrate, a signal line for transmitting a signal to a pixel formed in a display area composed of pixels on the insulating substrate. The signal line is used for transmitting gate and source signals. The display apparatus also has a driver integrated circuit (IC) mounted outside of the display area of the insulating substrate and electrically connected to the signal line. The display apparatus further has an inspection pad formed outside of the display area of the insulating substrate, electrically connected to the signal line, and covered with resin. This configuration allows protecting a TFT and the driver IC from damage due to incoming static electricity, and preventing corrosion of the inspection pad.

In the above display apparatus, the resin is preferably selected from the group consisting of silicon, acryl, urethane, epoxy, and polyimide.

It is also preferable that the resin is an anisotropic conductive film.

The above display device can further have a signal input pad formed outside of the display area of the insulating substrate, for inputting a signal from outside of the insulating substrate to the driver IC. The signal input pad and the inspection pad are covered with an anisotropic conductive film. This configuration allows protecting a TFT and the driver IC from damage due to incoming static electricity and preventing corrosion of the inspection pad without increasing the manufacturing process.

The above display apparatus can further have a conductive extension line connecting the signal line and the driver IC to the inspection pad. This configuration allows a smaller wiring area to achieve a smaller panel size.

The above display device can further have a wiring substrate for inputting a signal from outside of the insulating substrate to the driver IC. The wiring substrate and the signal input pad on the insulating substrate are electrically connected by the anisotropic conductive film. The wiring substrate covers the signal input pad and the inspection pad with the anisotropic conductive film interposed therebetween. This configuration assures prevention of incoming static electricity and pad corrosion.

In the above display apparatus, the wiring substrate is preferably a flexible substrate for easy substrate handling.

It is preferable in the above display apparatus that the inspection pad and the wiring substrate input pad are substantially aligned along near an edge of the insulating substrate. This configuration allows preventing incoming static electricity and pad corrosion without increasing the manufacturing process.

A method of manufacturing a display apparatus according to the present invention includes a step of forming a signal line for transmitting a signal to a pixel formed in a display area on the insulating substrate, and a step of implementing a driver integrated circuit (IC) outside of the display area of the insulating substrate and electrically connecting the driver IC to the signal line. The method also includes a step of forming an inspection pad outside of the display area of the insulating substrate and electrically connecting the inspection pad to the signal line, and a step of forming a signal input pad outside of the display area of the insulating substrate, for inputting a signal from outside of the insulating substrate to the driver IC. The method further includes a step of simultaneously covering the inspection pad and the signal input pad with an anisotropic conductive film. This method allows protecting a TFT and the driver IC from damage due to incoming static electricity, and preventing corrosion of the inspection pad without increasing the manufacturing process.

Another method of manufacturing a display apparatus according to the present invention includes a step of forming a signal line for transmitting a signal to a pixel formed in a display area on the insulating substrate, and a step of implementing a driver integrated circuit (IC) outside of the display area of the insulating substrate and electrically connecting the driver IC to the signal line. The method also includes a step of forming an IC signal pad at a position corresponding to a pad of the driver IC on the insulating substrate, a step of forming an inspection pad outside of the display area of the insulating substrate and electrically connecting the inspection pad to the signal line, and a step of forming a signal input pad outside of the display area of the insulating substrate, for inputting a signal from outside of the insulating substrate to the driver IC. The method further includes a step of simultaneously covering the inspection pad and the signal input pad with an anisotropic conductive film. This method allows protection of a TFT and the driver IC from damage due to incoming static electricity and prevention of corrosion of the inspection pad by more efficient operation The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
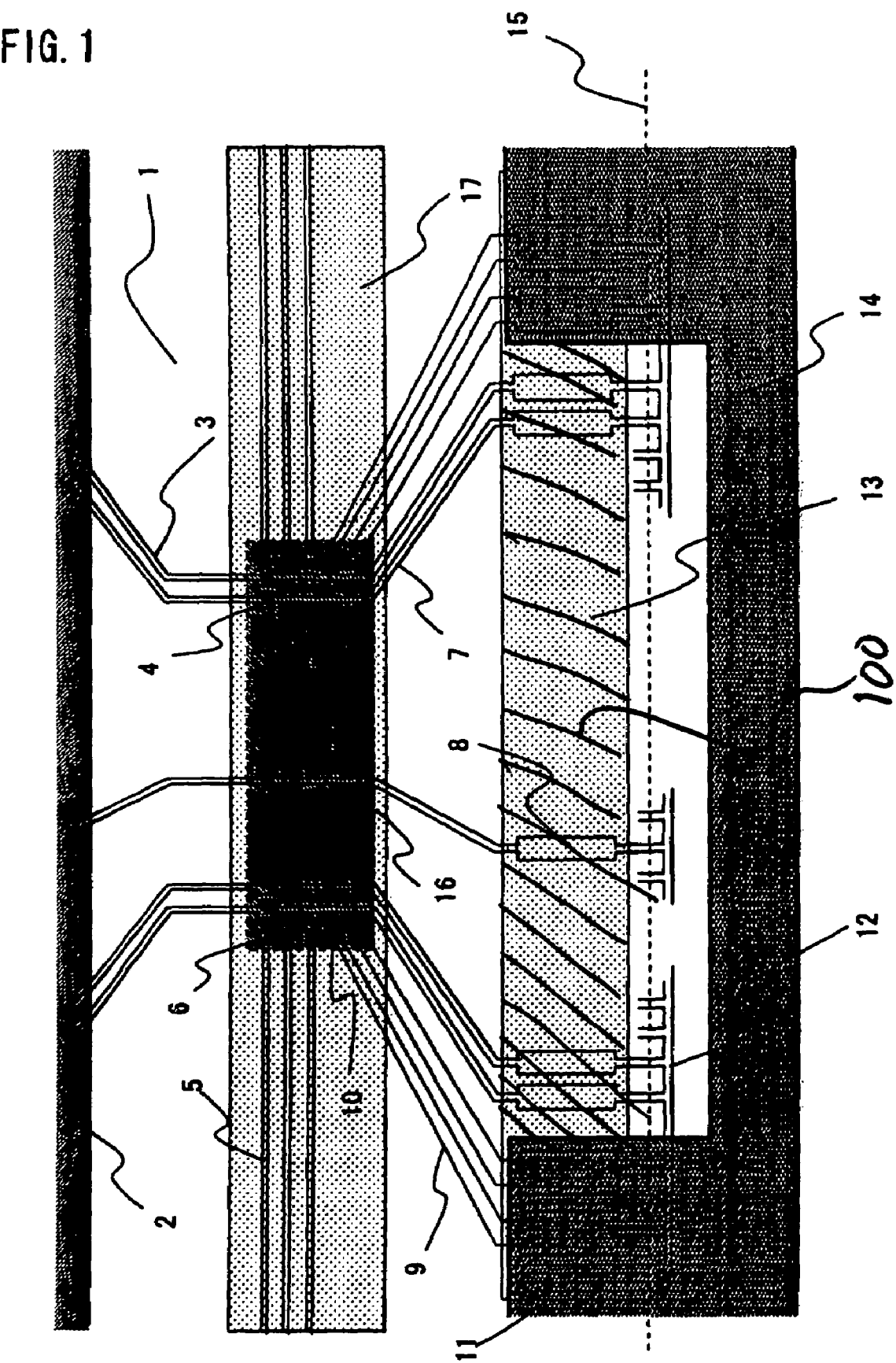
FIG. 1 is a plan view showing lines formed in the vicinity of a driver IC in a display apparatus according to the first embodiment of the present invention.

The first embodiment of the present invention will be described hereinafter in detail with reference to FIG. 1. FIG. 1 is a plan view showing lines formed in the vicinity of a driver integrated circuit (IC) in an active matrix display apparatus employing thin film transistors (TFTs) according to the first embodiment of this invention.

Referring to FIG. 1, the active matrix display apparatus has a TFT substrate 1, a color filter (CF) substrate 2, IC signal pads 4 on the TFT substrate 1, conductive lines 3 between a pixel and the IC signal pads 4, signal input/output lines 5, signal input/output pads 6, inspection pads 8, conductive extension lines 7 connecting the IC signal pads 4 and the inspection pads 8. The display apparatus also has IC power input pads 10, wiring substrate input pads 11, power source lines 9 connecting the IC power input pads 10 and the wiring substrate input pads 11, a shorting line 12, a wiring substrate 14, an anisotropic conductive film (ACF) 13 formed by resin for the wiring substrate driver IC 16, and an ACF 17 for the driver IC 16. A shorting line removal line, designated by the reference symbol 15, indicates a line for cutting and removing the shorting line 12.

As shown in FIG. 1, the IC signal pads 4 for inputting a signal to a pixel are formed near an edge of the TFT substrate 1. The conductive lines 3 are then formed to connect the IC signal pads 4 and the pixel. Further, in order to prevent incoming static electricity, there are formed the conductive extension lines 7 extending from the IC signal pads 4 toward the edge of the TFT substrate 1 and connecting the IC signal pads 4 and the inspection pads 8, and the shorting line 12 for shorting adjoining conductive lines at the edge of the TFT substrate 1. There is also provided the driver IC 16 for supplying a signal to the TFT. Signal input pads (not shown) of the driver IC 16 are formed in a row or in staggered fashion along a long side of the driver IC 16, the side facing the CF substrate 2. The driver IC 16 is positioned so that the signal input pads of the driver IC 16 are vertically aligned with the IC signal pads 4 of the TFT substrate 1. The driver IC 16 is mounted on the TFT substrate 1 with the ACF 17 interposed therebetween for electrically connecting the corresponding pads. Between the IC signal pads 4 and the shorting line 12 are formed the inspection pads 8 for inspecting a panel by probing. The inspection pads 8 are formed on the TFT substrate 1, near the short or long side edge thereof. Signal input/output pads (not shown) are formed on the driver IC 16 along the short side thereof for controlling a signal input to and output from the driver IC. The IC power input pads 10 are formed on the TFT substrate 1 in such positions that each of the IC power input pads 10 is vertically aligned with each of the signal input/output pads of the driver IC 16. The signal input/output pads of the driver IC and the IC power input pads 10 of the TFT substrate 1 are electrically connected via the ACF 17. The power source lines 9 extend from the IC power input pads 10 toward the edge of the TFT substrate 1. At the ends of the power source lines 9 are formed the wiring substrate input pads 11 for supplying electric power to the driver IC 16, formed substantially aligned with the inspection pads 8 along near at least one edge of the TFT substrate 1. The inspection pads 8 are exposed in the conventional technique, causing problems of corrosion of the pad due to contaminants and dew condensation, and static electricity entering through the inspection pads to damage the TFT and the driver IC.

In order to overcome the above problems, the present invention covers the inspection pads 8 with the ACF 13 after the panel inspection.

This configuration allows a smaller wiring area since the inspection pads 8 are connected with the conductive lines 3 and the driver IC 16 by the conductive extension lines 7, and formed along near an edge of the TFT substrate 1. It achieves a smaller panel size.

Further, since the wiring substrate input pads 11 and the inspection pads 8 are substantially aligned in this configuration, the both can be covered with the ACF 13. Therefore, conductive lines (not shown) formed on the wiring substrate 14 are connected with the wiring substrate pads 11 via the ACF 13, allowing connection of the wiring substrate at the same time as protection of the inspection pad 8. No additional manufacturing step is therefore required. The wiring substrate is preferably a flexible substrate for easy substrate handling.

It is also possible to cover the IC signal pads 4, the inspection pads 8, and the wiring substrate input pads 11 with an ACF at the same time. The simultaneous covering of the three kinds of pads reduces a step of depositing an ACF. Since the driver IC 16 is placed on the IC signal pads 4, the IC signal pads 4 and the corresponding pads on the driver IC 16 are electrically connected by the ACF 17. The ACF includes conductive particles distributed in a thermosetting or thermoplastic resin film. The ACF bonds and electrically connects the corresponding conductive pads.

Further, as shown in FIG. 1, the ACF 13 on the inspection pads 8 can be coated with resin 100 to assure prevention of incoming static electricity and pad corrosion. Silicon, acrylic, urethane, epoxy, and polyimide resin are preferable for coating material.

The wiring substrate 14 has such a shape that the portion above the inspection pads 8 is cut away not to overlap with the inspection pads 8. This configuration allows panel inspection and signal check of the driver IC 16 after mounting the wiring substrate 14 by simply removing the ACF 13 with a solvent.

The wiring substrate input pads 11 are connected to the shorting line 12 via conductive lines on the TFT substrate 1 for preventing static electricity problem. The shorting line 12 is finally removed at the shorting line removal line 15 by panel cutting, chamfering, or etching. The removal can be before or after mounting the driver IC 16 on the TFT substrate 1. Though this embodiment describes a case where the wiring substrate input pads 11 receive electric power, they can receive other signals. Also, though it describes that the driver IC 16 is a rectangle in which the side near the IC signal pads 4 and the conductive lines 3 are the long one, and the side near the signal input/output lines 5, signal input/output pads 6, and IC power input pads 10 is the short one, it is not limited thereto. For example, the IC signal pads 4 and the conductive lines 3 can be near the short side, and the signal input/output lines 5, signal input/output pads 6, and IC power input pads 10 can be near the long side. Further, the driver IC 16 is not necessarily rectangle-shaped. It is preferable that the conductive lines 3 and the IC signal pads 4 are formed on the side of the driver IC 16 facing the display area.

Figure 2:
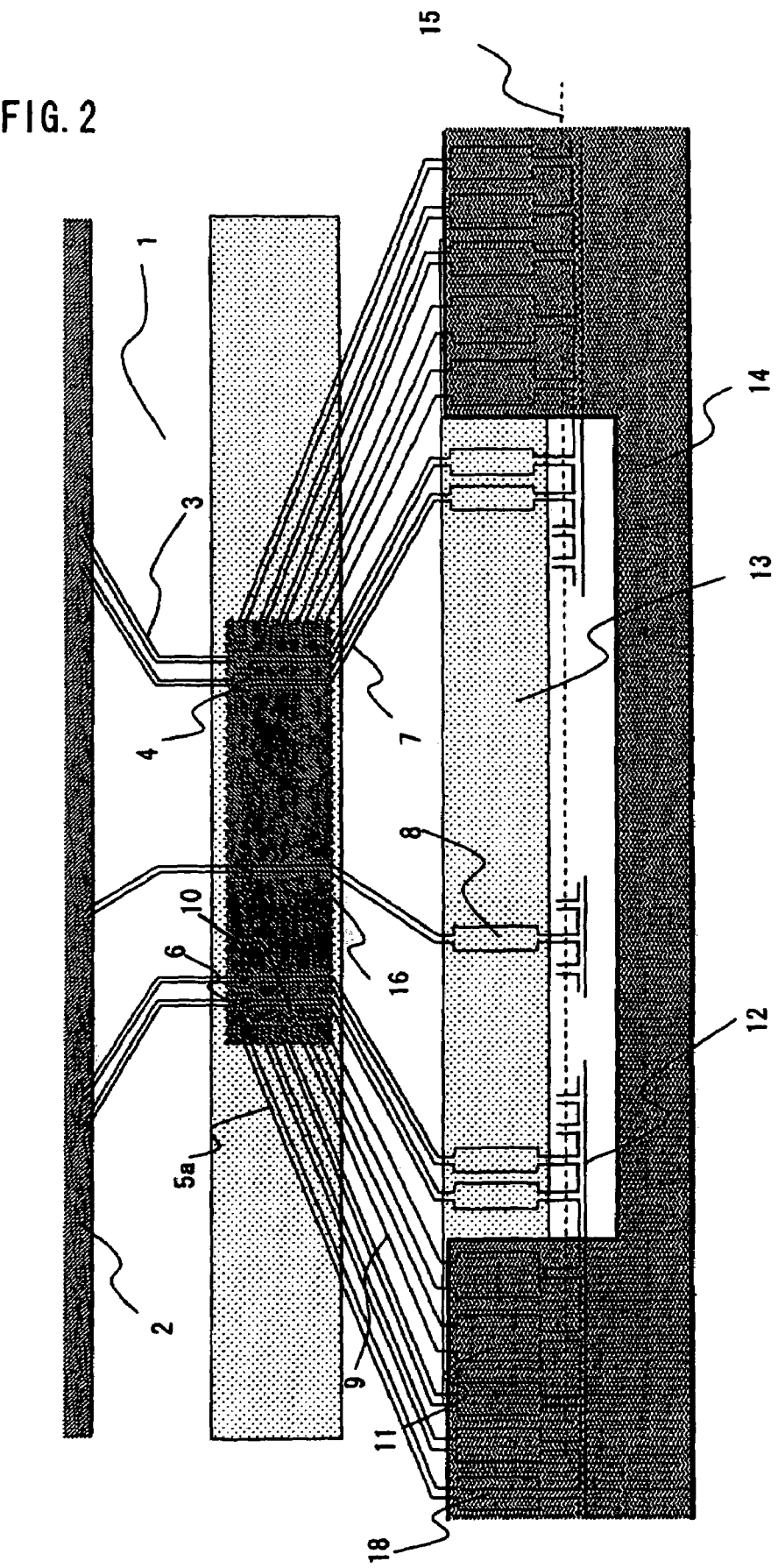
FIG. 2 is a plan view showing lines formed in the vicinity of a driver IC in a display apparatus according to the second embodiment of the present invention.

The second embodiment of the present invention will be described hereinbelow with reference to FIG. 2. FIG. 2 is a plan view showing lines formed in the vicinity of a driver IC in an active matrix display apparatus employing TFTs. In FIG. 2, the same elements as in FIG. 1 are denoted by the same reference symbols, and the difference will be explained. The first embodiment provides the signal input/output lines 5 between the signal input/output pads 6 along the short side of the driver IC 16 and signal input/output pads of the next driver IC 16, as shown in FIG. 1. The second embodiment, on the other hand, provides a signal input/output lines 5a extending from the signal input/output pads 6 toward the edge of the TFT substrate 1.

At the ends of signal input/outputs 5a are formed wiring substrate connection pads 18 for inputting and outputting signals, substantially aligned with the inspection pads 8 and the wiring substrate input pads 11. Signal input/output lines (not shown) for the driver IC 16 are formed on the wiring substrate 14 and connected to the wiring substrate connection pads 18 via the ACF 13. The other elements are the same as those explained in the first embodiment, and the same advantages can be obtained in this configuration.

Figure 3:
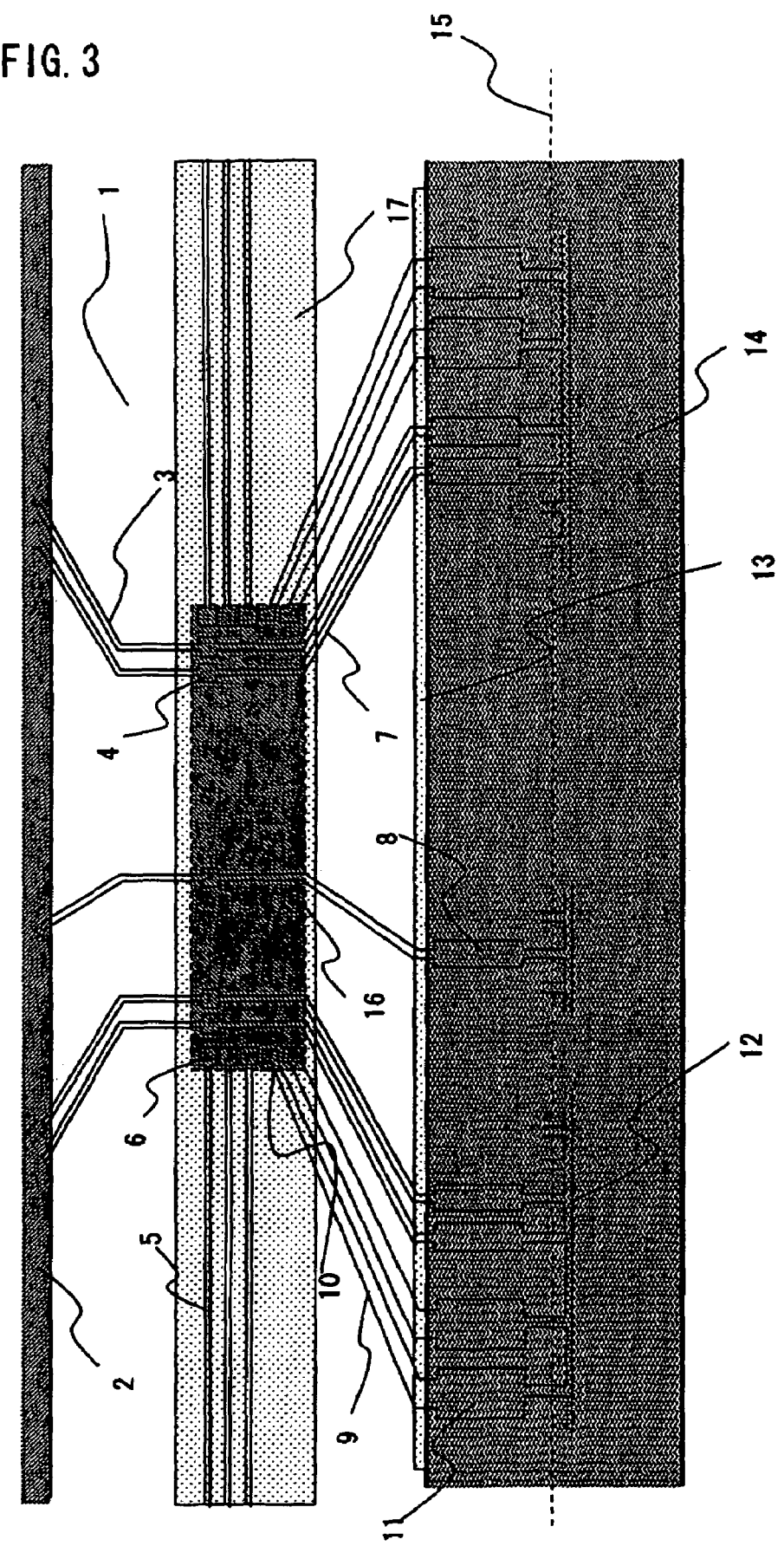
FIG. 3 is a plan view showing lines formed in the vicinity of a driver IC in a display apparatus according to the third embodiment of the present invention.
Figure 4:
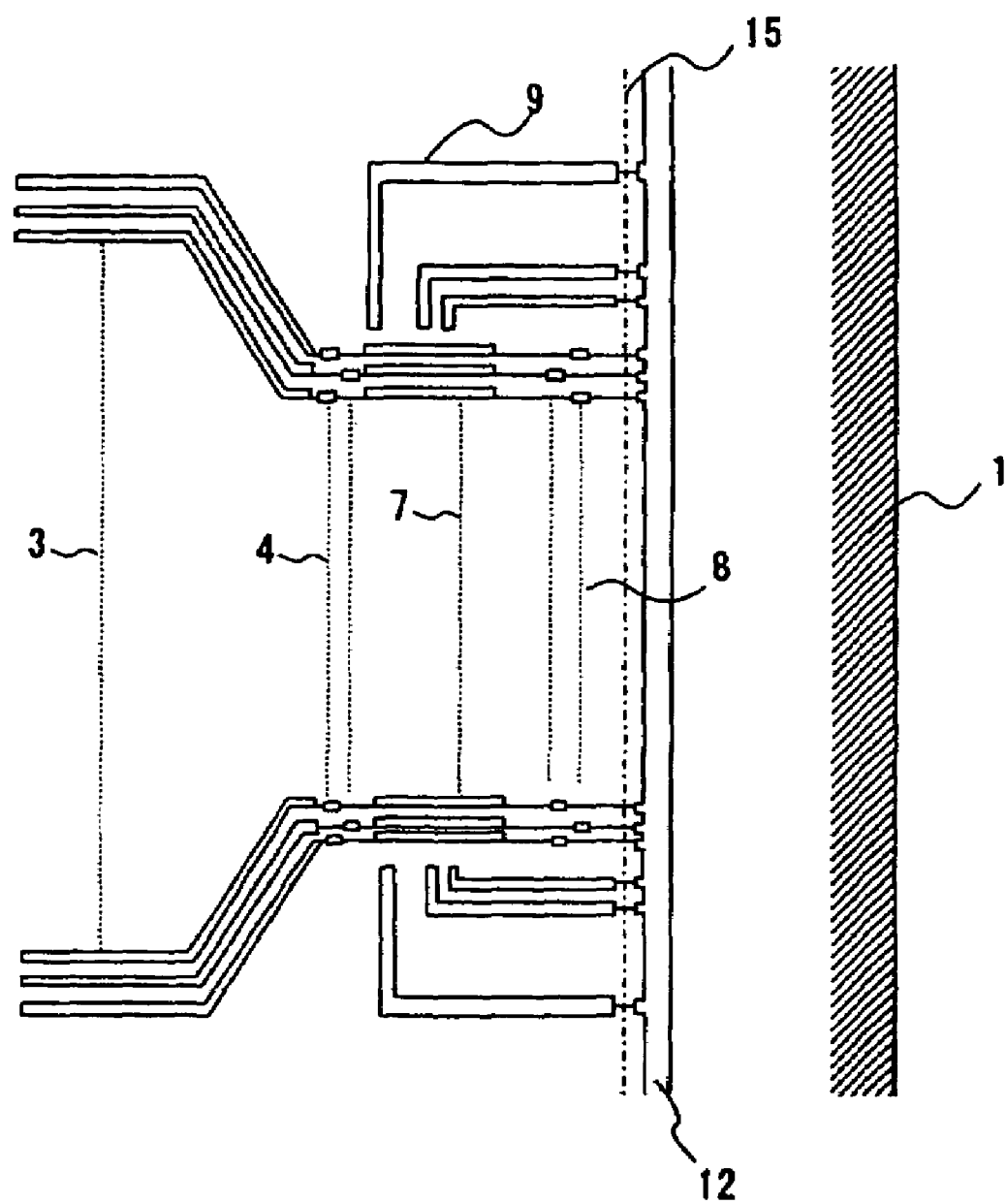
FIG. 4 is a plan view showing lines in a conventional display apparatus.

The third embodiment of the present invention will be described hereinbelow with reference to FIG. 3. FIG. 3 is a plan view showing lines formed in the vicinity of a driver IC in an active matrix display apparatus employing TFTs. In FIG. 3, the same elements as in FIG. 1 are denoted by the same reference symbols, and the difference will be explained. In the first embodiment, the wiring substrate 14 has such a shape that the portion above the inspection pads 8 is cut away not to overlap with the inspection pads 8 as shown in FIG. 1. In the third embodiment, on the other hand, the wiring substrate 14 covers the inspection pads 8.

In this configuration, the inspection pads 8 are protected with the wiring substrate 14 to assure prevention of incoming static electricity and pad corrosion. Since the wiring substrate 14 has no line pattern at the portion facing the inspection pads 8, no electrical connection is made between the wiring substrate 14 and the inspection pads 8. The other elements are the same as those explained in the first embodiment.

The wiring substrate connection pads 18 can be positioned into alignment with the inspection pads 8 and the wiring substrate input pads 11 as with the case with the second embodiment.

Although the first to third embodiments have explained a case where the ACF 17 is deposited to cover the entire area where the drive ICs are to be mounted on the TFT substrate 1 in order to electrically connect the IC signal pads 4 of the TFT substrate 1 and the pads of the driver IC 16, the ACF 17 can be deposited separately for each of the driver ICs. This reduces consumption of the ACF 17 to allow cost saving.

Also, though the above embodiments have described a case where the ACF 13 for the wiring substrate 14 and the ACF 17 for the driver IC 16 are deposited separately, a sheet of an ACF can be deposited for both of them for more efficient operation.

Further, the resin to cover the inspection pads 8 is not necessarily an ACF as in the above embodiments. Silicon, acryl, urethane, epoxy, and polyimide are other preferred materials for covering the inspection pads 8.

Furthermore, though the first to third embodiments explain a case where the present invention is applied to a display apparatus using liquid crystals as a preferred embodiment, it is not restricted thereto. The present invention is also applicable to a display apparatus using electroluminescent elements and any other display apparatus having inspection pads connected to signal lines for driving a pixel.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A display apparatus, comprising:
   an insulating substrate;
   a signal line for transmitting a signal to a pixel formed in a display area composed of pixels on the insulating substrate;
   a driver integrated circuit (IC) mounted outside of the display area of the insulating substrate and electrically connected to the signal line;
   an inspection pad formed outside of the display area of the insulating substrate, electrically connected to the signal line, and covered with a resin; and
   a wiring substrate for inputting a signal from outside to the driver IC,
   wherein the wiring substrate and a signal input pad are electrically connected by an anisotropic conductive film, and
   the wiring substrate covers the signal input pad, but the wiring substrate does not cover the inspection pad.

2. A display apparatus according to claim 1, wherein the resin is selected from the group consisting of silicon, acryl, urethane, epoxy, and polyimide.

3. A display apparatus according to claim 1, wherein the resin is the anisotropic conductive film.

4. A display apparatus according to claim 1, further comprising:
   a conductive extension line connecting the signal line and the driver IC to the inspection pad.

5. A display apparatus according to claim 2, further comprising:
   a conductive extension line connecting the signal line and the driver IC to the inspection pad.

6. A display apparatus according to claim 3, further comprising:
   a conductive extension line connecting the signal line and the driver IC to the inspection pad.

7. A display apparatus according to claim 1, wherein the wiring substrate is a flexible substrate.

8. A display apparatus according to claim 1, wherein the anisotropic conductive film is formed on the inspection pad and the anisotropic conductive film on the inspection pad is coated with the resin.

9. A display apparatus according to claim 8, wherein the resin is selected from the group consisting of silicon, acryl, urethane, epoxy, and polyimide.

10. The display apparatus according to claim 1, wherein the inspection pad is covered with the anisotropic conductive film that is covered with the resin.

* * * * *